(12) United States Patent
O'Kell et al.

(10) Patent No.: US 10,899,450 B2
(45) Date of Patent: Jan. 26, 2021

(54) LIGHTING SYSTEMS

(71) Applicant: Saf-T-Glo Limited, Cwmbran (GB)

(72) Inventors: Sean O'Kell, Cwmbran (GB); Roger Tanner, Cwmbran (GB); Lauren Fleming, Cwmbran (GB)

(73) Assignee: SAF-T-GLO LIMITED

( * ) Notice: Subject to any disclaimer, the term of this patent is extended or adjusted under 35 U.S.C. 154(b) by 0 days.

(21) Appl. No.: 16/374,959

(22) Filed: Apr. 4, 2019

(65) Prior Publication Data
US 2019/0329887 A1 Oct. 31, 2019

(30) Foreign Application Priority Data
Apr. 6, 2018 (GB) .................... 1805768.7

(51) Int. Cl.
*B64D 11/00* (2006.01)
*F21V 23/06* (2006.01)
(Continued)

(52) U.S. Cl.
CPC .............. *B64D 11/00* (2013.01); *B64D 47/02* (2013.01); *F21K 9/275* (2016.08); *F21K 9/90* (2013.01); *F21V 23/06* (2013.01); *B64D 2011/0038* (2013.01); *B64D 2011/0053* (2013.01); *B64D 2203/00* (2013.01); *F21W 2106/00* (2018.01);
(Continued)

(58) Field of Classification Search
CPC . F21K 9/275; F21K 9/90; F21V 23/06; B64D 11/00; B64D 7/02
See application file for complete search history.

(56) References Cited

U.S. PATENT DOCUMENTS

2008/0253122 A1 10/2008 Hancock et al.
2010/0008090 A1 1/2010 Li et al.
(Continued)

FOREIGN PATENT DOCUMENTS

CN 202284735 6/2012
EP 2868962 5/2015
(Continued)

OTHER PUBLICATIONS

Foreign Search Report Dated regarding Application No. GB 1904789. 3, dated Sep. 27, 2019, 4 pps.

*Primary Examiner* — Anne M Hines
(74) *Attorney, Agent, or Firm* — Foley & Lardner LLP (57) ABSTRACT

An aircraft LED retrofit modular lighting system adapted to be fitted into an aircraft in place of an existing lighting system wherein the retrofit lighting system is modular and comprises at least a housing for an LED lighting unit and a plurality of fixing brackets, the housing being formed of a plurality of components and comprising an elongate tray, at least a first end connector connectable to a first end of the tray, and an elongate lid attachable to the tray wherein the first end connector comprises a power connector fitting, arranged to be selected from at least a first and a second power connector socket, the first and the second power connector sockets being adapted to be interchangeably connected to the power connector fitting, and wherein the first power connector socket is arranged to connect to a first type of aircraft power supply system and the second power connector socket is arranged to connect with a second type of aircraft power supply system.

15 Claims, 7 Drawing Sheets

(51) Int. Cl.
*F21K 9/275* (2016.01)
*F21K 9/90* (2016.01)
*B64D 47/02* (2006.01)
*F21W 106/00* (2018.01)
*F21W 107/30* (2018.01)
*F21Y 103/10* (2016.01)
*F21Y 115/10* (2016.01)

(52) U.S. Cl.
CPC ...... *F21W 2107/30* (2018.01); *F21Y 2103/10* (2016.08); *F21Y 2115/10* (2016.08)

(56) References Cited

U.S. PATENT DOCUMENTS

| | | | |
|---|---|---|---|
| 2011/0309746 A1 | 12/2011 | Eckel et al. | |
| 2012/0033429 A1* | 2/2012 | Van De Ven | F21V 19/003 |
| | | | 362/294 |
| 2015/0124440 A1* | 5/2015 | Janjua | F21V 19/004 |
| | | | 362/223 |
| 2017/0280521 A1 | 9/2017 | Shan | |
| 2019/0081493 A1* | 3/2019 | Thiel | H01M 2/1022 |
| 2019/0364634 A1* | 11/2019 | Shan | F21S 4/28 |

FOREIGN PATENT DOCUMENTS

| | | |
|---|---|---|
| GB | 2 483 794 | 3/2012 |
| GB | 2 495 135 | 4/2013 |

\* cited by examiner

LIGHTING SYSTEMS

CROSS-REFERENCE TO RELATED PATENT APPLICATION

This application claims priority to and the benefit of United Kingdom Priority Application 1805768.7, filed Apr. 6, 2018, the entire disclosure of which, including the specification, drawings, claims and abstract, is incorporated herein by reference in its entirety.

BACKGROUND

This application concerns improvements in or relating to lighting systems. The invention has application to passenger transport vehicles and to aircraft in particular. The invention is particularly concerned with parts and fittings for lighting systems in aircraft.

Typically, fluorescent lighting has been used to illuminate passenger compartments in aircraft for normal activities. The lighting can be adjusted to alter the brightness to suit particular activities such as reading, sleeping or eating within the compartment of the aircraft.

It has become common to use LED lighting instead of fluorescent lighting in aircraft compartments. LED lighting offers a number of advantages with respect to power consumption, overall weight of the system, colour and controllability. New aircraft are manufactured with LED lighting installed.

Studies have shown that the use of LED lighting in an aircraft compartment significantly affects the perception, by passengers, of the age and safety of an aircraft. Airline operators have found that refurbishing the aircraft compartment to utilise LED lighting rather than fluorescent lighting can improve passenger perception of the aircraft and passenger satisfaction. Refurbishment and retrofitting of LED lighting to existing aircraft is therefore desirable. However, whilst it is relatively straightforward to install LED lighting as original equipment in new build aircraft it has been found that replacing fluorescent lighting with LED lighting during refurbishment is more complicated and this adds to the cost of installation of the LED lighting and to the overall cost of refurbishment.

A particular problem that has been encountered in retrofitting a lighting system is that it has to fit within a space envelope of an incumbent lighting system that is to be replaced. A length of fluorescent lighting housings may vary from one aircraft to another. In addition positioning of fixing points on an aircraft body may vary from one aircraft type to another. An angle of the housing relative to a side wall may also vary from one aircraft type to another. In replacing fluorescent lighting systems it may be necessary to change an angle of the housing of the lighting system relative to a side wall since LED lights are directional whereas fluorescent lights are omnidirectional. An additional problem that has been encountered is that a mating system connecting a lighting system to the aircraft power supply system may vary from one aircraft type to another. Typically one of two different mating systems is employed. In a first system a connector on the lighting housing is provided on a flying lead from the light unit and connects to the aircraft power system remote from the lighting housing. In a second system the connector on the lighting housing is arranged to connect directly to the aircraft power system at the lighting housing.

The present invention has been made from a consideration of the foregoing problems and aims to provide an improved system that can be readily retrofitted to existing aircraft and that provides an advantageous system for both an original manufacturer and installation in an aircraft as part of a retrofit.

SUMMARY

According to a first aspect of the invention there is provided an aircraft LED retrofit modular lighting system adapted to be fitted into an aircraft in place of an existing lighting system, wherein the retrofit lighting system is modular and comprises at least a housing for an LED lighting unit and a plurality of fixing brackets, the housing being formed of a plurality of components and comprising an elongate tray, at least a first end connector connectable to a first end of the tray, and an elongate lid attachable to the tray.

The first end connector comprises a power connector fitting, arranged to be selected from at least a first and a second power connector socket, the first and the second power connector sockets being adapted to be interchangeably connected to the power connector fitting, and wherein the first power connector socket is arranged to connect to a first type of aircraft power supply system and the second power connector socket is arranged to connect with a second type of aircraft power supply system In a particularly preferred embodiment at least the first end connector comprises a power connector fitting, arranged to be selected from at least a first and a second power connector socket. The first and the second power connector sockets are preferably adapted to be interchangeably connected to the power connector fitting.

The power connector fitting may be arranged to mate with a plurality of types of aircraft power supply systems. A first power connector socket may be arranged to connect to a first type of aircraft power supply system. A second power connector socket may be arranged to connect with a second type of aircraft power supply system.

This aspect of the invention will be further described in more detail below. It is a particular advantage of the present invention that the power connector fitting can be adapted to connect to a classic power supply fitting in an aircraft or may be adapted to connect to an enhanced power supply fitting in an aircraft.

The system may further comprise at least a first power connector. The first power connector may be arranged to be connectable to the first power connector socket and to a first type of aircraft power supply system. The system may further comprise a second power connector. The second power connector may be arranged to be connectable to the second power connector socket and to a second type of aircraft power supply system. In some embodiments the second power connector may be integrant with the second power connector socket.

A particular advantage of the invention is that the component parts may be held in stock and the system may be assembled as needed for a specific order. It will be appreciated that this removes the need to hold stock of multiple variants of a lighting housing so improving efficiency in assembling the lighting system and improving the efficiency of the manufacturing and supply process.

Desirably the retrofit lighting system is modular in that a lighting system comprises a number of interchangeable components. Advantageously the light system can be designed to fit a particular aircraft by selecting the components from a number of the interchangeable components.

Desirably the housing is modular and at least some of the components are arranged to be have a snap-fit connection.

In a preferred arrangement the housing comprises snap fit components. The components are preferably connectable together in a plurality of configurations. Desirably the components are adapted to connect together in a plurality of configurations such that the same components can be arranged to connect to multiple aircraft configurations. The different configurations may be referred to as alternative configuration variants.

It has been found that utilising snap fitting of components has greatly reduced housing assembly times. Preferably the housing does not include any components which are connected together by screws, rivets or bonding. Typically a prior art housing takes ¾ hour to an hour to assembly. A particular advantage of the invention is that the housing may be assembled from component parts in a matter of minutes. Prototype systems have been assembled in about 5 minutes.

The modular system may comprise a selection of alternative components.

As will be described in more detail below the housing in accordance with the first aspect of the invention has allowed a number of variant lighting systems, arranged to be installed in a variety of aircraft, to be assembled from standard and interchangeable components. The components may be injection moulded. The components are preferably formed of plastics such as polycarbonate or acrylics or acrylonitrile butadiene styrene or blends thereof. Other suitable plastics may be used. The skilled person may be able to select alternative plastics in accordance with desired properties and costs. Typically the plastics material may be thermoplastic. The plastics may be engineering grade. Preferably the plastics are flame retardant. In some embodiments the lid may be formed of a polycarbonate or a crystal styrene.

In some embodiments the lid is transparent. In other embodiments the lid is translucent.

The skilled person will appreciate that the housing may be formed from plastics that are easily recyclable. The plastics may be reground at the manufacturer and may be recycled in the manufacturing process. Desirably the manufacture process does not include any potting or sealing compounds or paint applies to the components. Desirably the assembly process does not include any potting or sealing compounds or paint being applied to the components. Use of potting or sealing compounds, or paints, require the components to be recycled by specialist recyclers.

It will be appreciated that a housing formed of components made from plastics materials may be significantly lighter than a housing formed from more conventional mixtures of plastics and metal materials. The skilled person will appreciate that reduced weight is a significant advantage with regard to lighting systems in aircraft. Additionally it has been found that the required variants can be formed from a small number of standard components so reducing the number and variety of components required to be stocked in order to retrofit LED lighting systems in different aircraft.

In one embodiment the housing further comprises a second end connector.

The elongate tray is preferably arranged to mount a printed circuit board (PCB) assembly. The elongate tray has a length. The length may be from 5 cm to 300 cm. More preferably the length is from 15 cm to 200 cm or from 10 cm to 100 cm. In some examples the tray may be for example between 10 and 15 cm or between 25 and 30 cm or between 50 and 65 cm. In some embodiments the lid is the same length as the tray. In other embodiments the lid may have a different length from the tray. In some embodiments the lid may have a length greater than the length of the tray. In some embodiments the lid may be shorter than and overall length of the light unit.

The PCB may be arranged to extend for the length of the tray. The lighting unit may comprise a single PCB or a number of PCBs. In some embodiments the lighting unit may comprise one LED PCB and in other embodiments there may be more than one LED PCB. In some embodiments there may be two or more PCBs. Additional PCBs may have alternate functions. In some embodiments the LED PCB may extend from the tray into at least the first end connector. The LED PCB may further comprise a number of LED lighting units in the form of light emitting diodes. In another embodiment the LED lighting units form a string that may be mounted on at least one strip that may be a separate strip. The LED lighting units may be electrically connected to the PCB. The housing may comprise a number of LED strings. The LED lighting units may emit a white light or a coloured light or the PCB may comprise a mixture of light emitting units. Preferably the PCB is arranged such that a white light is emitted or a coloured light is emitted or the colour of the emitted light may be changed. Preferably the lighting unit further comprises a controller unit. The controller unit may be provided as a PCB and may in some cases be separate from the LED PCB. The controller unit is preferably arranged to control the colour of emitted light. The controller may be arranged to change the colour of emitted light in response to an input. The input may be user controlled. The controller may be arranged to change the colour of emitted light. The change in colour of the emitted light may be in response to a predetermined pattern. The change in colour of the emitted light may be in response to a time input.

In some embodiments the controller may comprise a local interface unit. The interface unit may be arranged to programme the PCB controller. The local interface unit may be provided in the housing. The local interface unit may be an infra-red (IR) unit. The IR interface desirably facilitate programming of lighting profiles. The IR interface may be used to calibrate the LED light output and to input a lighting configuration. An additional remote interface unit may be provided remote from the housing. The remote interface unit may comprise a user input unit, such as a keyboard or other input method. The remote interface may be configured to input lighting configurations and lighting profiles. The remote interface may communicate with the controller by means of the IR unit.

The or each PCB may be mounted in the connector and/or the tray by means of clips. Desirably the clips allow expansion of the PCB in the course of use of the PCB and thermal expansion thereof.

The controller PCB may be connected to a power supply and this is discussed in more detail below.

Preferably the lid is transparent or translucent. The lid may have a length substantially the same as the elongate tray. Alternatively the lid may have a length that is greater than the length of the elongate tray. Preferably the lid is arranged to be attachable to the first end connector in the housing. The lid may further be arranged to be attachable to the second end connector. In a preferred arrangement the first and second end connectors are arranged to be a snap-fit connection to respective first and second ends of the tray. The first and second ends of the tray may be interchangeable. In a preferred embodiment the lid is arranged to extend for substantially the whole length of the housing and to be attachable to the first and second end housing and to the tray.

In some embodiments a base unit of the housing may comprise the tray and the first and/or second end connectors.

In a preferred embodiment a connection between the lid and the base unit is a snap-fit connection. The snap fit connection may utilise a double wall fixing method. Desirably the snap fit connection between the lid and the base unit reduces risk of accidental detachment of the lid from the base unit.

In a preferred arrangement the lid comprises an arch formed of a longitudinally extending top and first and second side walls. At least one side wall may further comprise a laterally extending flange.

Preferably the first and the second side walls further comprise a laterally extending flange. Preferably the side wall comprises an additional portion extending beyond the flange. The laterally extending flange may have at least one clip. The clip may comprise a longitudinally extending flange having a skirt extending substantially parallel to the side wall. Desirably the skirt has a clip projection extending from a distal end of the skirt towards the side wall. The clip projection is preferably arranged to engage with a corresponding clip portion on the base unit. Preferably the laterally extending flange and the skirt with the clip projection extend longitudinally for substantially the whole length of the lid.

Desirably the base unit comprises at least a portion of a wall having an outwardly extending clip portion. The outwardly extending clip portion may be arranged to be at a distal end of the wall. The outwardly extending clip portion is preferably arranged to engage with the skirt and projecting clip. Preferably the outwardly extending clip portion is received within a channel formed between the skirt and the additional portion of the side wall.

Preferably the lid is unitary and the top, first and second side walls, flange, skirt and clip are formed of the same material. The lid may be injection moulded. The lid may be formed of a transparent plastics material such as polycarbonate or crystal styrene.

In some embodiments the lid may be provided with a seal. The seal may comprise a rubber material such as a thermoplastic elastomer which may be co-extruded with the polycarbonate material of the lid. The seal may protect the housing from ingress of environmental contaminants such as water. The seal may also provide a more secure fit.

The base unit may have a first end connector housing and a second end connector housing. The first and second end housing may be the same or different. The or each end housing preferably has a fixing section adapted to cooperate with a respective fixing bracket. The fixing section may comprise one or more receiving portions in a side wall of the housing. In a preferred arrangement the fixing section comprises a first groove in a first side wall and a second groove in a second side wall opposed to the first side wall. The first and the second receiving portions are preferably in an outer face of the first and second side walls. The fixing brackets will be described in more detail below.

One of the end connectors may be a simple end connector formed from a housing arranged to have a base, first and second side walls. The simple end connector housing may have an end wall. The simple end connector housing may have interior fixings arranged to receive at least a part of the PCB or a support for an LED strip. The simple end connector housing may be arranged and adapted to have a snap fit connection to the tray. The second end connector housing may form a part of the base unit once connected to the tray. Preferably the first and the second side walls of the simple end connector housing may comprise a laterally extending flange at a distal end. The first and second side walls may be arranged to be a snap fitting to the lid.

One of the end housings may be a power connector housing. The power connector housing may be arranged to have a base, first and second side walls. The power connector housing preferably has an end wall. The power connector housing preferably has interior fixings arranged to receive a part of the PCB or a support for an LED strip. The power connector housing may additionally be arranged to have interior fixings arranged to support a controller unit comprising a controller PCB. The controller unit may comprise a communication device. Alternatively the controller PCB may be arranged to communicate with the IR unit and through the IR unit to a used input. The controller unit may be arranged to control power supplied to the LED strip and/or LED PCB. The IR unit may be provided in the end connector. The IR unit may comprise an IR board and a transducer arranged to provide 2 way communication with at least the remote interface unit. The IR unit may be further arranged to transmit data from the controller to a remote interface.

Preferably the power connector housing further comprises at least one power connector fitting. The power connector fitting may be arranged to mate with the power supply delivery system in the aircraft. The power connector fitting may comprise a first end arranged to connect with a fitting in the power connector housing and a second end arranged to connect to a power supply system in the aircraft. Typically power supply delivery systems in aircraft systems have power supplied by fittings known as classic or enhanced. The power connector fitting may be arranged to may be adapted to mate with a classic power supply system or may be arranged to mate with an enhanced power supply system. The classic power supply system requires a connector fitting that has a supply end arranged to mate with a socket of the power supply system in the aircraft and a flexible lead, such as a cable, that extends to the power connector end housing. The combination of power connector fitting and cable may be referred to as a harness. A delivery end of the lead may be provided with a plug arranged to connect to a socket in the power connector end housing.

The power connector fitting may be arranged to mate with a plurality of aircraft power supply systems. This feature is a particular advantage as it has previously been necessary to provide a light unit that is designed specifically for either a classic power supply or for an enhanced power supply but it has not been possible to use the same fitting for both power supply systems. This has introduced added complexity and cost in retrofitting LED lighting systems.

In some embodiments the housing may be provided with a power connector fitting in the form of a socket arranged to receive a plug on a connector in the aircraft as may be found in a classic power supply. In another embodiment the housing may be provided with a socket and a replacement connector adapted to connect to the socket in the connector end housing and having a supply end adapted to mate with a socket of the power supply in the aircraft.

In other embodiments the end housing connector is provided with a socket arranged to receive an enhanced power supply plug. The plug may be provided with the housing or the housing may be arranged to connect to an existing plug in the aircraft.

The connector end housing may be arranged and adapted to have a snap fit connection to the tray. The connector end housing may form a part of the base unit once connected to the tray. Preferably the first and second side walls of the power connector housing may comprise a laterally extending flange at a distal end. The first and second side walls of the power connector housing may be arranged to be a snap fitting to the lid.

In some embodiments the power connector housing may be arranged to connect to either a classic power supply system or to connect to an enhanced power supply system. In retrofitting a housing in accordance with the invention a power connector fitting may be selected to match the power supply system in the aircraft and fitted to a tray and simple end housing to form the housing. The parts may be readily snap fitted to together to form a base unit and a lid connected to the base unit.

In a preferred embodiment the modular lighting system comprises a number of components from which a suitable combination is selected to fit to the aircraft system in which the lighting system is being retrofitted. A power system is already installed in the aircraft and mounting points for the lighting units are provided in the cabin. The aircraft cabin mounting points will also dictate a space envelope available for the lighting system.

The brackets to be used and a tray length is selected from a range of trays and brackets in order to fit the existing point. A power connector housing may be snap fitted to the tray. A power connector fitting is selected from classic or enhanced in view of the power supply system on the aircraft and a first end thereof may be fitted to the power connector housing. An end connector may be snap fitted to a distal end of the tray to form the base unit. A controller PCB and LED PCB may be selected from a range of available sizes in view of the available length of the base unit. Once the PCBs have been installed in the base unit a suitable length lid may be snap fitted to the base unit. A second end of the power connector fitting is connected to the power supply in the aircraft.

It will be appreciated that varying a power connector fitting enables the power connector housing to be connected to both a classic system and to an enhanced system aircraft. The base unit maybe formed to match the existing mounting points by selecting an appropriate length tray—the end connector housing and the power connector housing may be utilised for all systems. The skilled person will appreciate that instead of requiring a separate housing unit for each particular aircraft arrangement the same components can be used to provide a housing unit for any aircraft.

Aircraft having fluorescent fittings have a connection system and fixing locations in a body of the aircraft. Each fixing location is provided at a predetermined distance from the power connection location. In prior art systems an LED housing has to be designed to replace a fluorescent fitting in either a classic connection system or an enhanced connection system. It has been found that location of the fixing points is such that an end housing which is adapted to connect to a classic system then the housing cannot be fixed to an aircraft having an enhanced system. The predetermined distance from the power connection system to the fixing point is such that the fixing is located over the power connection socket. Classic and enhanced systems have been found to be mutually incompatible. Typical prior art systems have been manufactured from metal and plastics parts which have to be securely fitted together. Separate systems have had to be manufactured for classic and enhanced systems.

The housing may comprise at least a first and a second fixing section. Each fixing section may be adapted and arranged to connect to a respective fixing bracket. In a preferred embodiment the housing comprises a first end housing and a second end housing and each end housing is arranged to connect to a respective fixing bracket.

The system further comprises a plurality of the fixing brackets. Each fixing bracket comprises a base plate adapted to be secured to an aircraft surface or wall. Each fixing bracket may further comprise a stem. Preferably the stem is arranged to be able to rotate relative to the base plate.

The base plate may in use be secured to the aircraft surface or wall by means of a screw. The base plate further comprises a socket. The fixing bracket comprises a stem, a frame and first and second arms extending from opposed sides of the frame. The stem, frame and arms may be unitary. In some embodiments the stem, frame and arms may be formed from a single moulding. The moulding is preferably formed without joints or parts. In other embodiments the frame and arms may be formed from a single moulding. The stem may be formed from a separate moulding and connected to the frame. In another embodiment the stem may be formed separately and the frame and arms may be formed of a unitary moulding.

The frame may extend in a plane. The plane in which the frame extends is preferably angled relative to a direction in which the stem extends. The plane in which frame extends may be transverse to the direction in which the stem extends. In some embodiments the frame may be transverse to the stem. The arms may be formed in a generally U shape. Desirably the arms are arranged to extend in a direction transverse to the plane in which the frame extends. The arms may be angled or parallel relative to the stem. In other embodiments the plane in which the frame extends may be obliquely angled relative to the direction in which the stem extends. In such an arrangement the housing is held at an oblique angle relative to the wall of the aircraft cabin in which the housing is fitted.

The arms may be relatively flexible having a U shape. A cross piece of the arms may be located above a latch on side walls of the connectors. The arms may be moved apart as the end connectors are inserted into the fixing bracket. The arms may snap into place as the cross pieces are located above respective latches on the respective side walls of the end connectors.

The stem may be removably connected to the base plate. The stem is preferably rotatably connected to the base plate. Desirably once connected the stem is able to rotate relative to the base plate. The stem and base plate may be connected by a ball and socket connection. Alternatively a pin connection may be utilised. The pin connection may allow rotation of the frame in at least one plane.

The stem may be described as a short fixing in which the frame is spaced relatively close to the base plate. In another arrangement the stem may be relatively longer and the frame is spaced further from the base plate. The frame may be transverse to the direction of the stem or may be at an oblique angle thereto. In another embodiment the stem may be formed separately from the frame and arms and the stem may be angled. The frame may be pivotally connected to the stem. The stem may be pivotally connected to the base plate.

Depending on a space envelope in the aircraft a longer stem or a shorter stem or an angled stem may be selected. The stem and frame may be connected to the base plate in order to locate the housing at a desired distance from a wall of the aircraft.

Desirably the arms are arranged to clip to the LED housing and to locate the LED housing between the arms and adjacent the frame.

In a preferred arrangement the frame is able to rotate relative to the base plate. A particular advantage has been found in the preferred arrangement in that the LED housing can be push fitted into a first fixing bracket. As a second fixing bracket is connected to the LED housing the first fixing bracket is able to rotate to allow the LED housing to self-align rather than requiring manual adjustment.

It will be appreciated that the retrofit lighting system can be designed to fit a particular aircraft. The components may be selected from a number of interchangeable components. It will be appreciated that the system enables a retrofit lighting system for either a classic power supply system or an enhanced power system may be designed from standard and interchangeable components.

According to a second aspect of the invention there is provided an aircraft LED lighting system comprising a housing for an LED lighting unit and a plurality of fixing brackets, the housing having a plurality of components and comprising an elongate tray, at least a first end connector connectable to a first end of the tray, an elongate lid attachable to the tray and wherein at least the first end connector comprises multiple connecting locations adapted to cooperate with a respective fixing bracket.

The first end housing preferably has receiving portions on side walls, wherein the receiving portions are arranged to receive the arms or at least a portion of the arms.

Preferably the first end housing is a power connector end housing. The connector end housing may be a power connector housing adapted to provide a connection to the power supply system of the aircraft. The power connector end housing may be adapted to connect to a classic power connection in the aircraft or may be adapted to connect to an enhanced power connection in the aircraft. In some embodiments the power connector end housing may be arranged to connect to both a classic power system and an enhanced power system.

The system may further comprise a simple end connector having a housing. The simple end connector housing and/or the simple end housing may be arranged to snap fit to the tray. The lid may be arranged to be a snap fit to the tray. The lid may also be a snap fit to the simple end connector and to the power end connector. The fixing brackets are preferably arranged to be a snap fit onto the power end connector housing and the simple end connector housing.

Preferably the first and second end connectors are adapted to cooperate with the fixing brackets. The first and second end connectors may be provided with receiving portions and latches adapted to receive and retain arms of the fixing brackets.

The first end connector housing may be a power connector housing. The power connector housing is provided with multiple connecting locations arranged to cooperate with the respective fixing bracket and to secure the housing to the fixing bracket and thus to the aircraft wall.

According to a third aspect of the invention there is provided a lighting system adapted to mount an LED lighting unit in an aircraft, the lighting system comprising a number of components adapted to be connectable to form at least one housing for an LED lighting unit, the lighting system comprising at least an elongate tray, a first end connector connectable to a first end of the tray, an elongate lid attachable to the tray and a plurality of fixing brackets which can be secured to the aircraft and wherein the components are adapted to be fitted together in a desired configuration.

Preferably at least the first end housing comprises multiple fixing bracket positions.

Desirably the lighting system is modular such that the components can be fitted together to form the housing. Preferably the components can be snap fitted together. In an alternative embodiment the components may be push fitted together.

According to a fourth aspect of the invention there is provided an LED lighting system comprising a housing and at least one fixing bracket having a built in pivot.

Preferably the fixing bracket comprises a base plate adapted to be secured to an aircraft wall. The base plate may further comprise a socket. The fixing bracket may comprise a stem, a frame and first and second arms extending from opposed sides of the frame. The stem, frame and arms may be unitary.

The frame may be pivotally connected to the stem. The stem may be pivotally connected to the base plate.

The frame may extend in a plane. The plane in which the frame extends is preferably angled relative to a direction in which the stem extends and may be transverse or obliquely angled relative to the direction in which the stem extends. The arms may be formed in a generally U shape. The arms may be relatively flexible having a U shape.

The stem may be removably connected to the base plate. The stem is preferably rotatably connected to the base plate. Desirably once connected the stem is able to rotate relative to the base plate. The stem and base plate may be connected by a ball and socket connection. Alternatively a pin connection may be utilised. The pin connection may allow rotation of the frame in at least one plane.

According to a fifth aspect of the invention there is provided a method of retrofitting an LED system to an aircraft the method comprising removing an existing light fitting from an aircraft cabin wall and fitting an LED lighting system in accordance with a preceding aspect of the invention wherein the method comprises securing a first and a second fixing bracket to the aircraft wall and fitting the LED housing unit to the fixing brackets.

The fixing brackets may be selected in accordance with a desired space envelope for the LED lighting system. The first end connector may be a power connector and may be selected to connect to the power supply system in the aircraft.

BRIEF DESCRIPTION OF THE DRAWINGS

The invention will now be described by way of example only with reference to the accompanying figures in which.

DETAILED DESCRIPTION

Figure 1:
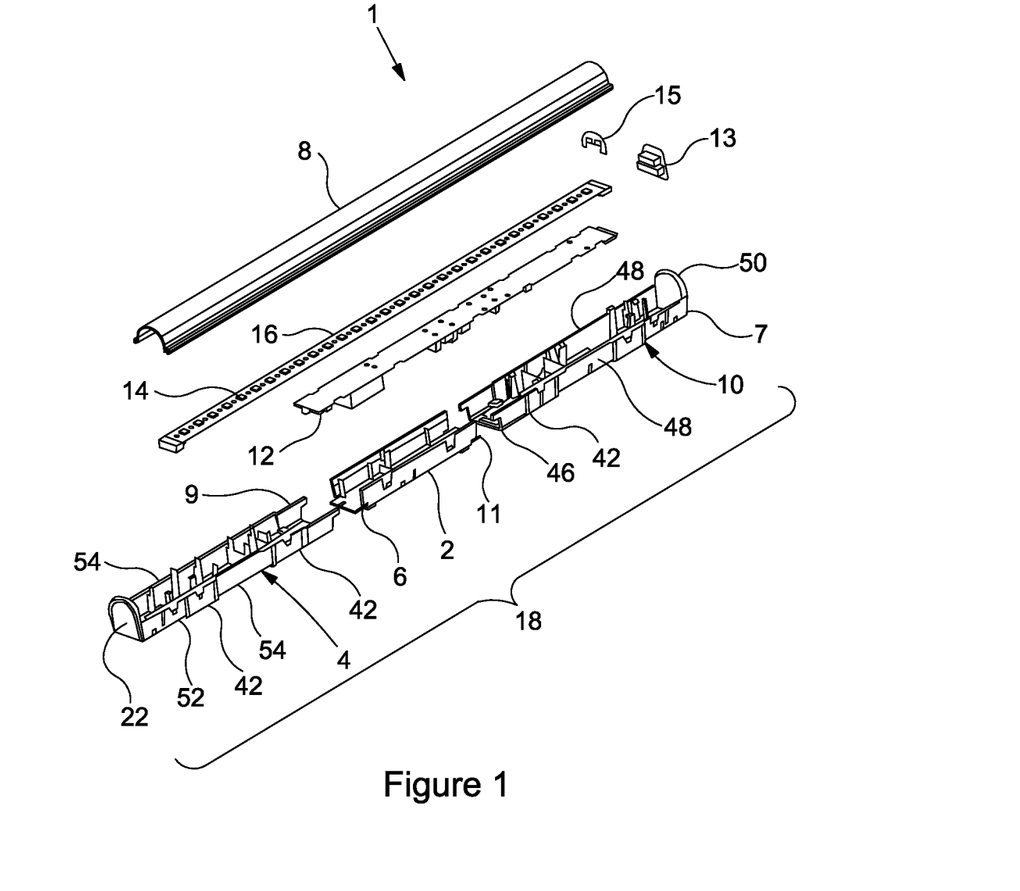
FIG. 1 is an exploded view of a housing of a lighting system in accordance with the invention.

FIG. 1 is an exploded view of an LED lighting system in accordance with the invention and comprises a housing 1 for an LED lighting unit, the housing 1 having a plurality of components and comprising an elongate tray 2, a first end connector 4 connectable to a first end 6 of the tray and an elongate lid 8 attachable to the tray 4. The housing 1 further comprises a second end connector 10 connected to a second end of the tray. The first end connector 4 is a power end connector and the second end connector 10 comprises a simple end housing 7. A printed circuit board (PCB) 12 is provided mounted in the elongate tray 2. The PCB 12 further extends into a housing 9 of the power connector 4.

The LED lighting housing 1 is modular and at least some of the components are arranged to be have a snap-fit connection. The components are arranged to be connected together in a plurality of configurations such that the same components can be arranged to connect to multiple aircraft configurations. The different configurations may be referred to as alternative configuration variants.

Utilising snap fitting of components has greatly reduced housing assembly times. A particular advantage of the invention is that the housing 1 may be assembled from component parts in a matter of minutes and in some cases prototype systems have been assembled in about 5 minutes. The housing 1 allows a number of variants to be assembled from standard and interchangeable components. It has been found that a number of required variants can be formed from a small number of standard components so reducing the components required in order to retrofit an LED lighting system in a number of different types of aircraft.

The components are injection moulded and formed of plastics such as polycarbonate. Other suitable plastics may be used The elongate tray 2 is arranged to mount the printed circuit board (PCB) assembly. The elongate tray 2 has a length which typically in preferred embodiments may be from 10 cm to 100 cm and the PCB may be arranged to extend for the length of the tray. The PCB further comprises a number of LED lighting units 14 which form a string that is mounted on a separate strip 16. The housing 1 may be arranged to contain one or more LED strings. The LED lighting units can be arranged to emit a white light or a coloured light or the PCB may comprise a mixture of light emitting units. The PCB is arranged such that a white light is emitted or a coloured light is emitted or the colour of the emitted light may be changed. The PCB 12 further comprises a controller unit which can be arranged to control the colour of emitted light. The controller may be arranged to change the colour of emitted light in response to a user controlled input.

The controller may also comprise an interface unit in the form of an IR board 13 which may be arranged to programme the PCB unit. In some cases a shield 15 may additionally be provided. The shield 15 may be arranged to dissipate static charge that builds up over time and that can interfere with IR communication between the IR unit and a remote interface.

The lid 8 is transparent or translucent. In this embodiment the lid is transparent to UV light. In this embodiment the lid 8 has a length that is greater than the length of the elongate tray and the lid 8 is arranged to be attachable to the first end connector housing. The first 4 and second 10 end connectors are arranged to be a snap-fit connection to respective first 6 and second 11 ends of the tray.

The tray 2 and the first and second end connectors 4, 10 form a base unit 18 of the housing. A connection between the lid 8 and the base unit 18 is a snap-fit connection. The snap fit connection utilises a double wall fixing method.

Figure 2:
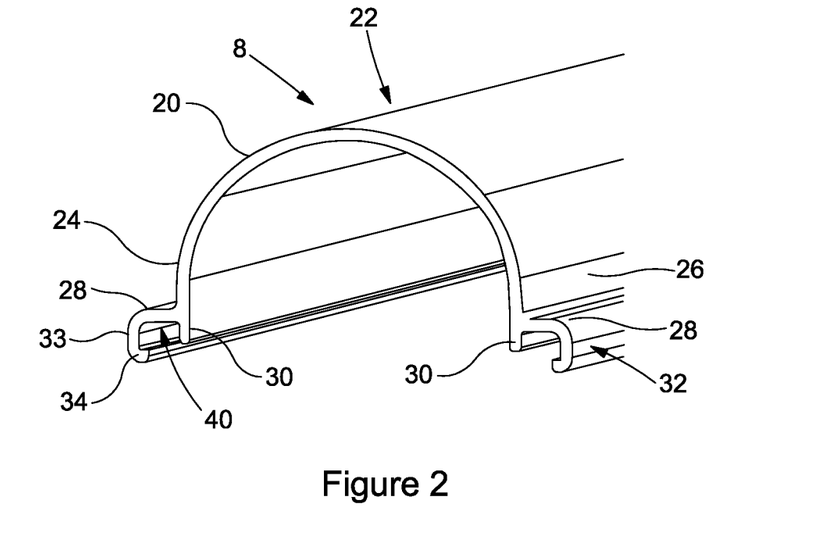
FIG. 2 is a view of the lid of the housing of FIG. 1.

As detailed in FIG. 2 the lid 8 comprises an arch 20 formed of a longitudinally extending top 22 and first and second side walls 24, 26. Each side wall further comprises a laterally extending flange 28. Each side wall 24, 26, comprises an additional portion 30 extending beyond the flange 28. The laterally extending flange 28 has at least one clip 32 comprising a skirt 33 extending substantially parallel to the side walls 26, 38 and additional portions 30. The skirt 33 has a clip projection 34 extending from a distal end of the skirt 33 towards the side wall additional portion 30. The clip projection 34 is arranged to engage with a corresponding clip portion on the base unit 18. The laterally extending flange 28 and the skirt 33 with the clip projection 34 extend longitudinally for substantially the whole length of the lid 8.

Figure 3:
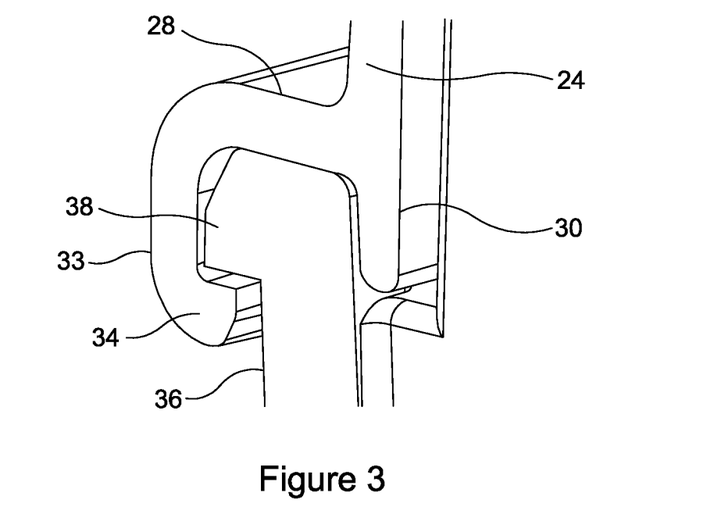
FIG. 3 is a cross section view of a connection between the tray and the lid.

In FIG. 3 it can be seen that the base unit 18 comprises at least a portion of a wall 36 having an outwardly extending clip portion 38 which is arranged to be at a distal end of the wall 36. The outwardly extending clip portion 38 is arranged to engage with the skirt 33 and clip projection 34 and the outwardly extending clip portion is received within a channel 40 formed between the skirt 33 and the additional portion 30 of the side walls 24, 26.

The lid 8 is unitary and the top 22, first and second side walls 24, 26, flange 28, skirt 33 and clip projection 34 are formed of the same material and may be injection moulded. The lid is formed of a transparent plastics material such as polycarbonate or crystal styrene. Other suitable materials may be used instead.

In one embodiment the lid 8 is provided with a seal comprising a rubber material. The seal provides a more secure fit.

The base unit has a first end connector 4 and a second end connector 10. The first and second end connectors each comprise a housing that may be the same or different. The or each end housing has a fixing section 42 adapted to cooperate with a respective fixing bracket 44. The fixing section 42 comprises a latch on a first side wall and a second lug on a second side wall opposed to the first side wall. Each end connector has a plurality of fixing sections such that a suitable fixing section can be selected in order to co-operate with mounting locations in the aircraft cabin. Typically suitable fixing locations are an outer pair, an intermediate pair or an inner pair of fixing locations on the end connector housing and/or in the power connector housing.

As described above the lighting system is modular and is arranged to be connected together from component parts. A simple end housing 100 may be connected to one end of the elongate tray 102. The system may comprise more than one elongate tray component. Each tray may comprise a length. The length may be a first length or a second length. The second length may be longer than the first length. The system may be assembled from an elongate tray selected from a tray 102 comprising a first length or from a tray comprising a second length. A power connector housing may be connected to a second end of the elongate tray.

Figure 8:
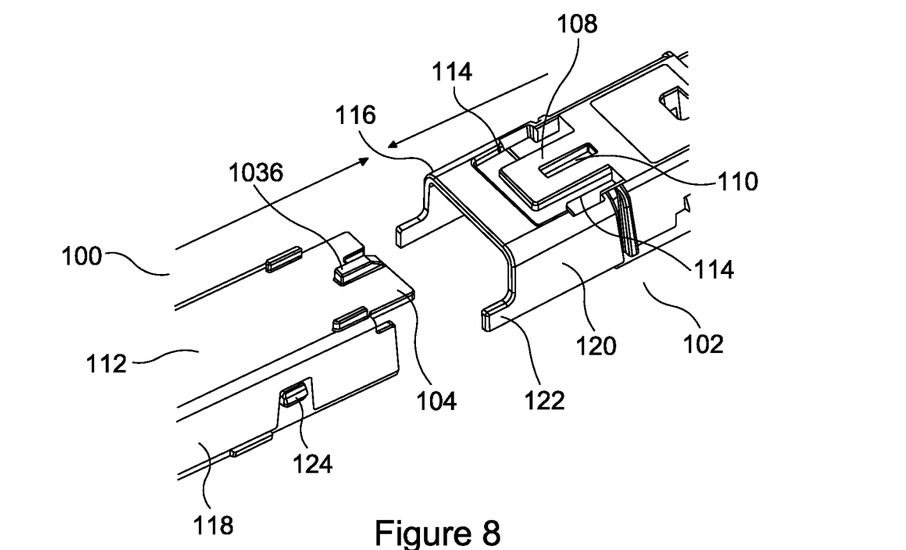
FIG. 8 is a perspective view of an end of an elongate tray and a first end connector prior to connection.
Figure 9:
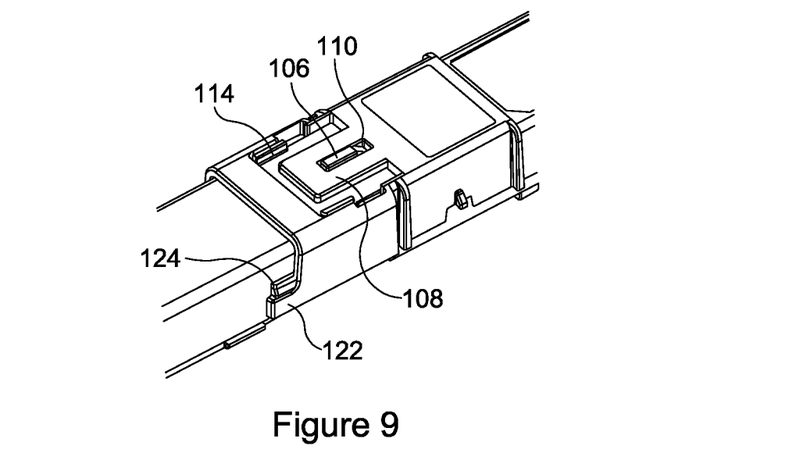
FIG. 9 is a perspective view of a connection between the elongate tray and the first end connector of FIG. 8 when connected.
Figure 10:
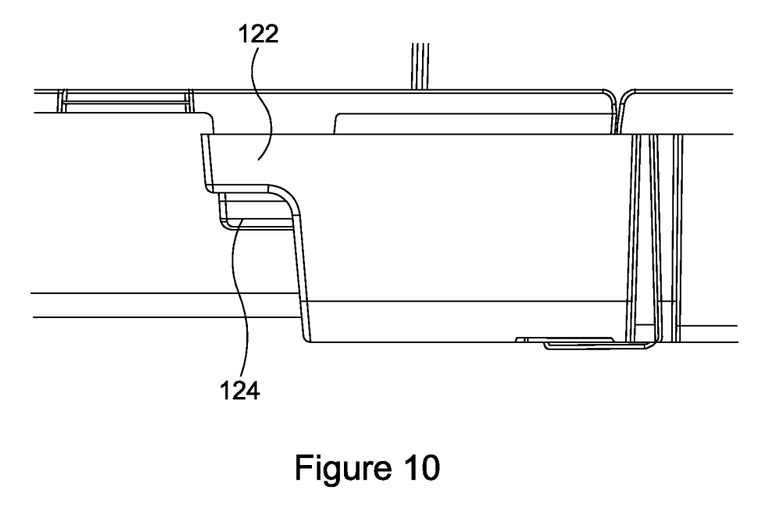
FIG. 10 is a side view of the connection of FIG. 9.

Referring now to FIGS. 8-10, a novel interconnection method and arrangement is provided. The interconnection arrangement is provided to allow for the mating and secure engagement of the modular tray parts. The interconnection arrangement comprises a combination of tab 104, boss 106, lug 108 and slot 110 features. One end of the elongate tray 102 comprises a tab 104 extending along a plane of a base 112 of the tray. A locking boss 106 is provided on an outer surface of the tab 104.

The end housing 100 is provided with cut away section 114 into which the lug 108 extends. The tab 104 on the tray 100 extends under the lug 108 on the end housing 102. A slot 110 is provided in the lug 108. The locking boss 106 is arranged to engage with the slot 110 in the lug to lock the tray 100 to the end housing 102.

The end housing 102 further comprises an extending casing 116 arranged to extend over the base 112 and side walls 118 of the end of the tray. Either side wall 120 of the casing 116 comprises extending lugs 122 which are arranged to interact and lock with outwardly extending locking bosses 124 on side walls of the tray. It has been found that the described arrangement has a particular advantage in providing a space efficient connection between the tray and the end connector or end connectors. This is particularly advantageous in the restricted space of an aircraft cabin in which space is at a premium. Additionally where the lighting system is being retrofitted into an existing cabin the system has to fit within the same space envelope as that of the system being replaced. This can be a problem as newer systems contain more electronics than older systems. It will be appreciated that the described interconnection is provided substantially within the thickness of the housing and so space within the tray and end connector is not reduced and additionally the interconnection is within a footprint of the housing. It has been found that the described interconnection is able to fit within the space envelope of an existing system and also to provide internal space for additional electronics.

Each end of the tray may be arranged to have a tongue. Alternatively one end of the tray may be provided with a tab and the other end of the tray may be provided with a cut-away section and tongue.

The end connectors will be described in more detail below.

One of the end connectors is a simple end connector 10 formed of a housing 50 arranged to have a base 46, first and second side walls 48. The simple end housing 50 has an end wall and may have interior fixings arranged to receive a part of the PCB or a support for an LED strip. The simple end housing 50 is arranged and adapted to have a snap fit connection to the tray 2. The second end connector forms a part of the base unit 18 once connected to the tray. The first and the second side walls of the simple end housing 50 comprise a laterally extending flange at a distal end and the first and second side walls 48 are arranged to be a snap fitting to the lid.

Figure 5:
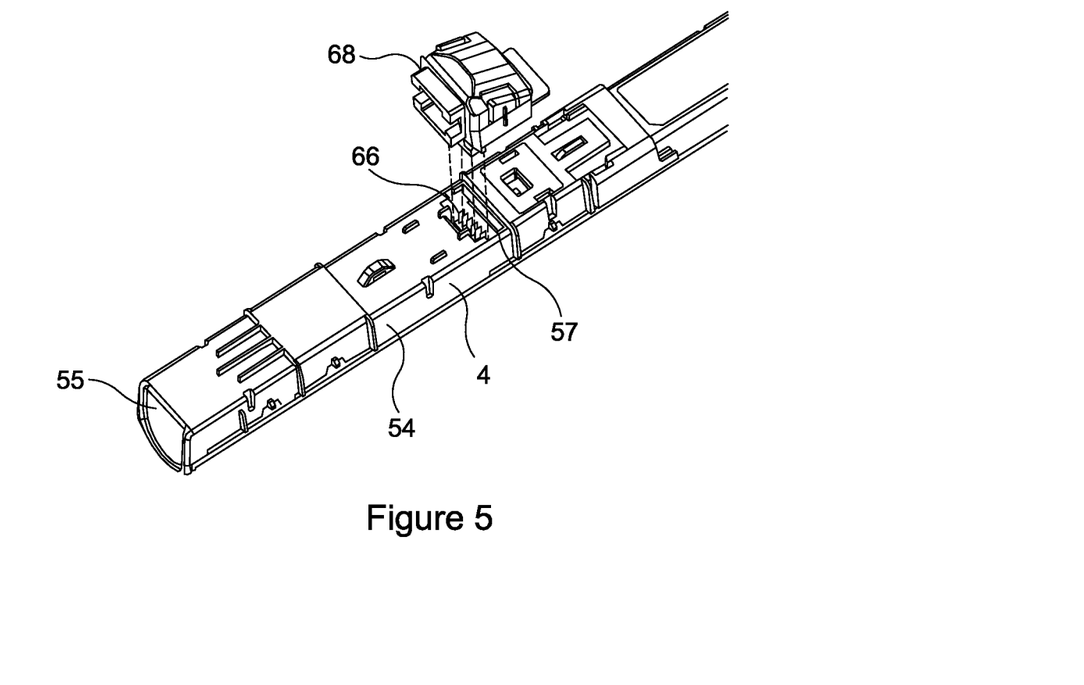
FIG. 5 is a view of an enhanced power connector.

One of the end housings is a power connector housing 4, shown in FIG. 5. The power connector housing 4 is arranged to have a base 52, first and second side walls 54. The power connector housing has an end wall 55 and has interior fixings arranged to receive a part of the PCB 12 or a support 16 for an LED strip. The controller is provided on the PCB 12 and the PCB 12 is arranged to clip into the end housing.

The power connector housing 4 further comprises at least one power connector fitting 57. The power connector fitting 57 is arranged to mate with the power supply delivery system in the aircraft. Power supply delivery systems in aircraft systems have power supplied by classic or enhanced fittings. The power connector fitting 57 is arranged or adapted to mate with a classic power supply system or is arranged to mate with an enhanced power supply system. For connection to a classic power system, shown in FIG. 4, the housing has a classic connector fitting 56 that has a supply end 58 arranged to mate with a socket of the power supply system in the aircraft and a flexible lead 60, such as a cable, that extends to the connector end housing 4. A delivery end of the lead is provided with a plug 62 arranged to connect to a socket 64 in the power connector fitting 57 in connector end housing 4. A combination of supply end 58, cable 60 and plug 62 may be defined as a harness.

Figure 4:
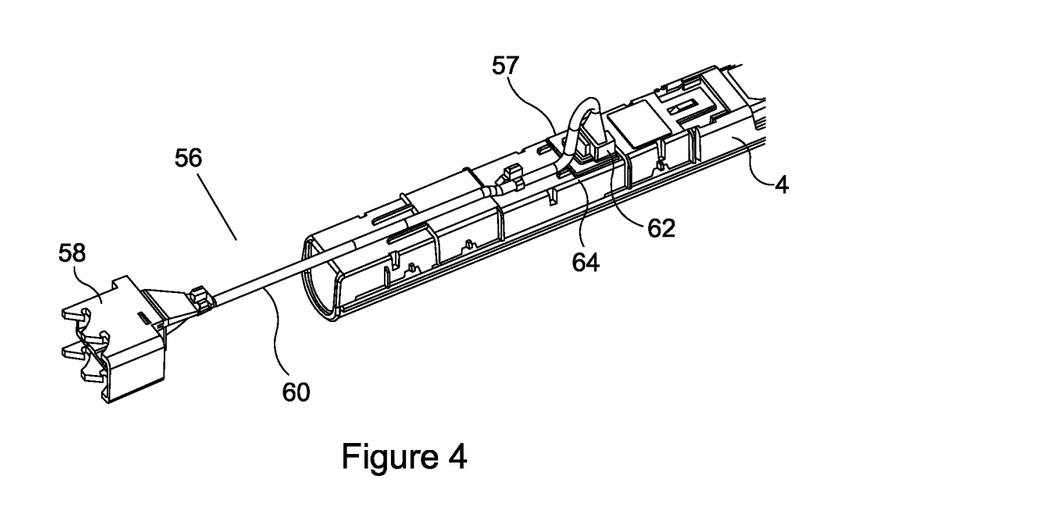
FIG. 4 is a perspective view of a classic power connector.

The housing can be provided with a classic power connector 57 fitting in the form of the socket 64 arranged to receive a plug 62 on an existing connector in the aircraft. Alternatively the housing is provided with a socket 64 and a replacement connector 56 adapted to connect to the socket 64 in the connector end housing and having a supply end 58 adapted to mate with a socket of the power supply in the aircraft.

In other embodiments the connector end housing 4 is provided with an enhanced socket 66 arranged to receive an enhanced power supply plug 68. The plug 68 may be provided with the housing 4 or the housing may be arranged to connect to an existing plug in the aircraft.

The connector end housing 4 is arranged and adapted to have a snap fit connection to the tray 2 and forms a part of the base unit 18 once connected to the tray. The first and second side walls 54 of the power connector housing have a laterally extending flange at a distal end and are arranged to be a snap fitting to the lid 8.

In retrofitting an LED housing in accordance with the invention a power connector fitting may be selected to match the power supply system in the aircraft and fitted to a tray and a simple end housing may be connected to a second end of the tray to form a base unit. The parts are readily snap fitted to together to form the base unit and a lid is connected to the base unit.

In retrofitting an LED housing unit and LED lighting system to an aircraft having fluorescent fittings account has to be taken of the existing aircraft connection system and fixing locations in a body of the aircraft. Each fixing location is provided at a predetermined distance from the power connection location. In prior art systems an LED housing has to be designed to replace a fluorescent fitting in either a classic connection system or an enhanced connection system and it has been found that location of the fixing points is such that an end housing which is adapted to connect to a classic system then the housing cannot be fixed to an aircraft having an enhanced system. The predetermined distance from the power connection system to the fixing point is such that the fixing is typically located over the power connection socket.

Figure 6A:
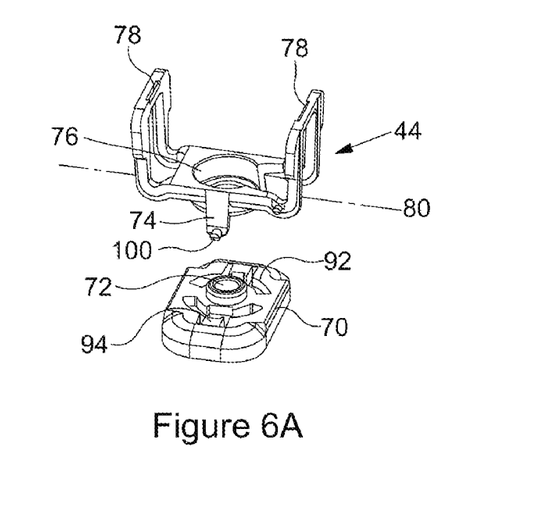
FIGS. 6A, 6B and 6C are a perspective view of three alternative fixing brackets in accordance with the invention.
Figure 6B:
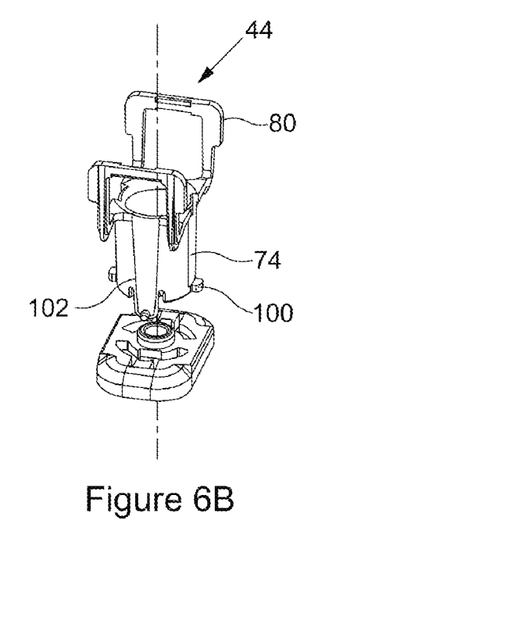
Figure 6C:
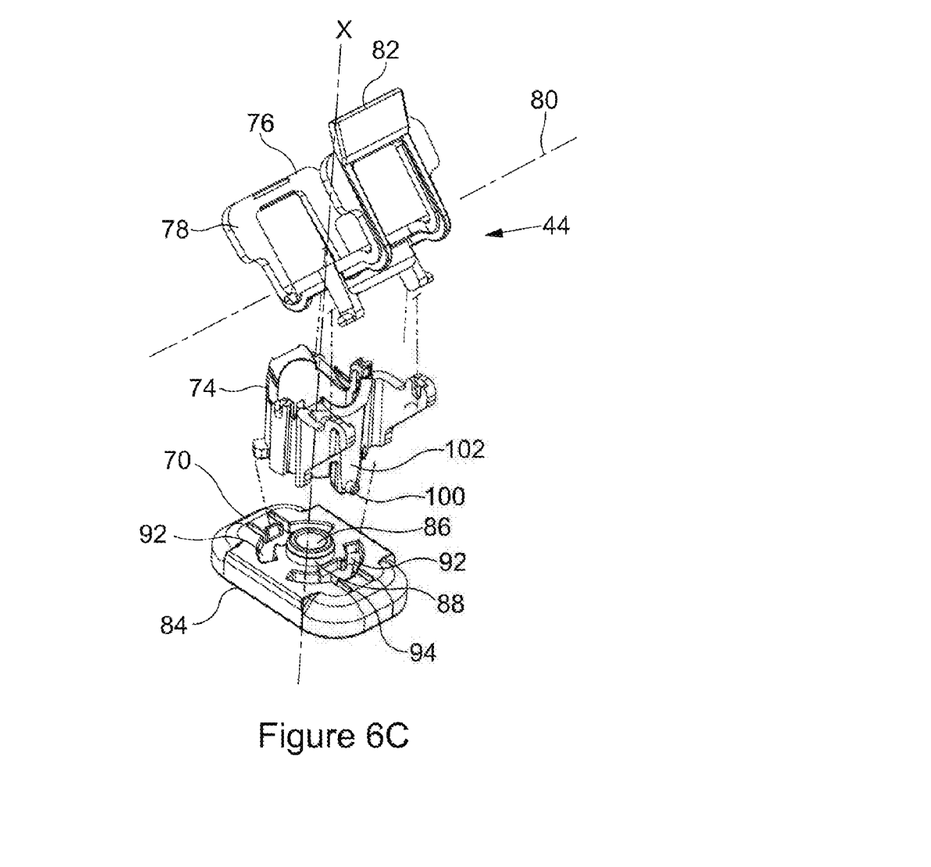

The system in accordance with the invention further comprises a plurality of the fixing brackets 44. Each fixing bracket 44 comprises a base plate 70 adapted to be secured to an aircraft wall. The base plate 70 is in use secured to the aircraft wall by means of a screw (not shown). The base plate further comprises a socket 72. The fixing bracket comprises a stem 74, a frame 76 and first and second arms 78 extending from opposed sides of the frame 76. The stem 74, frame 76 and arms 78 are unitary.

The frame may extend in a plane 80. In one embodiment as illustrated in FIGS. 6A and 6B the plane in which frame extends is transverse to the direction X in which the stem 74 extends. In another embodiment illustrated in FIG. 6C the plane 80 in which the frame 76 extends is obliquely angled relative to the direction X in which the stem 74 extends. In such an arrangement the housing is held at an oblique angle relative to the wall of the aircraft cabin in which the housing is fitted. The arms 78 are formed in a generally U shape and are arranged to extend in a direction transverse to the plane in which the frame extends. The arms may be angled or parallel relative to the stem 74.

The arms 78 are relatively flexible having a U shape. A cross piece 82 of the arms are arranged to be received in retaining portions in side walls of the connector housing. The arms may be moved apart as the end connector housings are inserted into the fixing bracket 44. The arms snap into place as the cross pieces 82 are received into the retaining portions on the end connector housings.

Figure 7:
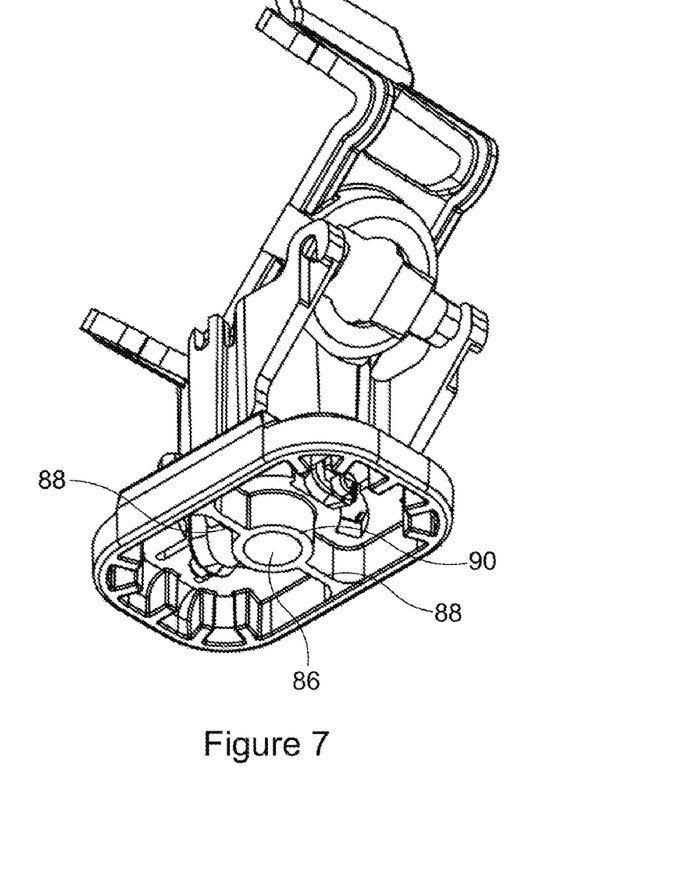
FIG. 7 is a perspective view of an underside of the fixing bracket of FIG. 6C.

As can be seen in FIGS. 6C and 7, each base plate 70 comprises an element 84 arranged to be mounted on a surface of the aircraft cabin. The base plate 70 comprises a central aperture 86 through which a screw may secure the base plate to the surface. A side wall 88 is arranged to extend from either side of the base plate to a wall 90 surrounding the aperture. In this embodiment the walls 88 extend across a relatively shorter dimension of the base plate 70. A semi-circular slit aperture 92 is provided on either side of the walls 88. A deflecting portion 94 is provided on opposing edges of the first and second apertures 92.

The stem 74 is rotatably connected to the base plate 70. The stem and base plate are connected by an interaction between pins 100 provided on lugs 102 of the stem 74.

In assembling the bracket fixing the lugs on the stem 74 deflect inwards such that the pins 100 are able to move past the deflecting portions 94 to an under surface of the base plate. The under surface of the base plate is arranged to be adjacent the surface of the aircraft cabin. The lugs 102 spring out once the pins have passed through the slit aperture and the lugs are arranged to extend through and rotate within the slit aperture. The pins 100 are retained against the under surface of the base plate and the stem 74 is able to rotate relative to the base plate. Each end of the slit aperture acts as a stop to rotation such that there is limited rotation of the stem relative to the base. Up to 90° of rotation may be achieved from one end stop to the other end.

The stem 74 can be a short fixing in which the frame is spaced relatively close to the base plate as illustrated in FIG. 6A or the stem may be relatively longer such that the frame is spaced further from the base plate as illustrated in FIG. 6B. In another embodiment the stem is formed separately from the frame and arms and the stem is angled as illustrated in FIG. 6C. Depending on a space envelope available in the aircraft a longer stem or a shorter stem or an angled stem may be selected. The stem and frame may be connected to the base plate in order to locate the housing at a desired distance from a wall of the aircraft. The arms are arranged to clip to the LED housing and to locate the LED housing between the arms and adjacent the frame. A particular advantage has been found in the preferred arrangement in that the LED housing can be push fitted into a first fixing bracket 44. As a second fixing bracket is connected to the LED housing the first fixing bracket is able to rotate to allow the LED housing to self-align rather than requiring manual adjustment.

It has been found that the system in accordance with the invention has advantages in that the housing can be rapidly built from snap fitting together component parts from a modular system. A suitable power connector may be selected or a suitable power connector fitting may be inserted in the power connector housing to connect to the existing power supply system. The fixing brackets are simple and straightforward to fit to the aircraft wall and a suitable fixing bracket can be selected according to the available space envelope in the aircraft. The end connector housings are arranged to have multiple connection points for engagement with the fixing brackets. The fixing brackets have a rotatable connection and so are self-aligning and improve the ease of fitting the LED housing to the aircraft.

Use of modular components that may be snap fitted together has significantly reduced the time for building the housing and allowed the components to be used to connect the LED housing to separate power supply systems.

What is claimed is:

1. An aircraft LED retrofit modular lighting system adapted to be fitted into an aircraft in place of an existing lighting systems, comprising:
   at least a housing for an LED lighting unit and a plurality of fixing brackets, the housing being formed of a plurality of components and comprising an elongate tray;
   at least a first end connector connectable to a first end of the tray; and
   an elongate lid attachable to the tray;
   wherein the first end connector comprises a power connector fitting, arranged to be selected from at least a first and a second power connector socket, the first and the second power connector sockets being adapted to be interchangeably connected to the power connector fitting;
   wherein the first power connector socket is arranged to connect to a first type of aircraft power supply system and the second power connector socket is arranged to connect with a second type of aircraft power supply system; and
   wherein the retrofit lighting system is modular.

2. The aircraft LED retrofit modular lighting system according to claim 1, wherein:
   the housing is modular; and
   the components are adapted to connect together in a plurality of configurations.

3. The aircraft LED retrofit modular lighting system according to claim 1, wherein the first end connector comprises multiple connecting locations adapted to cooperate with a respective fixing bracket.

4. The aircraft LED retrofit modular lighting system according to claim 1, wherein the power connector fitting comprises a socket arranged to receive a plug on a connector in the aircraft from a classic power supply.

5. The aircraft LED retrofit modular lighting system according to claim 1, wherein the power connector is provided with a socket arranged to receive an enhanced power supply plug.

6. The aircraft LED retrofit modular lighting system according to claim 1, wherein the housing further comprises a first and a second fixing section adapted to cooperate with a respective fixing bracket.

7. The aircraft LED retrofit modular lighting system according to claim 1, wherein at least one fixing bracket has a built in pivot.

8. The aircraft LED retrofit modular lighting system according to claim 1, wherein each fixing bracket comprises a base plate, adapted to be secured to an aircraft surface, and a stem and the stem is connected to the base plate such that the stem is able to rotate relative to the base plate.

9. The aircraft LED retrofit modular lighting system according to claim 1, wherein at least some of the components are arranged to be have a snap-fit connection.

10. The aircraft LED retrofit modular lighting system according to claim 9, wherein the snap fit connection utilises a double wall fixing method.

11. The aircraft LED retrofit modular lighting system according to claim 1, wherein the lid is provided with a seal.

12. The aircraft LED retrofit modular lighting system according to claim 1, wherein the housing further comprises a second end connector.

13. The aircraft LED retrofit modular lighting system according to claim 1, wherein the tray and at least the first end connector comprises a base unit of the housing and the lid is arranged to be attachable to the base unit.

14. The aircraft LED retrofit modular lighting system according to claim 13, wherein a connection between the lid and the base unit is a snap-fit connection.

15. An aircraft cabin comprising an LED modular lighting system, comprising:
- at least a housing for an LED lighting unit and a plurality of fixing brackets, the housing being formed of a plurality of components and comprising an elongate tray;
- at least a first end connector connectable to a first end of the tray; and
- an elongate lid attachable to the tray;
- wherein the first end connector comprises a power connector fitting, arranged to be selected from at least a first and a second power connector socket, the first and the second power connector sockets being adapted to be interchangeably connected to the power connector fitting;
- wherein the first power connector socket is arranged to connect to a first type of aircraft power supply system and the second power connector socket is arranged to connect with a second type of aircraft power supply system; and
- wherein the lighting system is modular.

\* \* \* \* \*